United States Patent [19]

Willey, Sr.

[11] 4,178,581

[45] Dec. 11, 1979

[54] INTEGRATED ANTENNA APERTURE

[75] Inventor: Robert E. Willey, Sr., Joppa, Md.

[73] Assignee: The Bendix Corporation, Southfield, Mich.

[21] Appl. No.: 957,492

[22] Filed: Nov. 3, 1978

[51] Int. Cl.² .............................. G01S 1/16; G01S 1/18
[52] U.S. Cl. ......................... 343/108 M; 343/100 SA
[58] Field of Search ............. 343/108 M, 100 SA, 854

[56] References Cited

U.S. PATENT DOCUMENTS

| | | | |
|---|---|---|---|
| 3,877,012 | 4/1975 | Nelson | 343/100 SA |
| 3,999,182 | 12/1976 | Moeller et al. | 343/108 M |

*Primary Examiner*—Theodore M. Blum
*Attorney, Agent, or Firm*—Bruce L. Lamb; William G. Christoforo

[57] ABSTRACT

A microwave landing system employing a phased array antenna for the generation of narrow, scanning guidance beams in which broad beam antennas used for transmitting identification signals, fly-left, fly-right guidance signals and the like with broad coverage are eliminated by applying spoiling phases to the phase shifters of the array thereby broadening the beam shape of the array to a pattern substantially identical to the pattern of a broad beam antenna formerly used. The spoiling phases are applied to the array in the time slots allocated to transmission of broad beam signals and the broad beam signals are then transmitted by the array. The spoiling phases are removed from the array during the time slots allocated to transmission of narrow scanning beams and the narrow scanning beams are then transmitted by the array. Computation of spoiling phases to provide particular patterns for particular antennas is disclosed.

4 Claims, 12 Drawing Figures

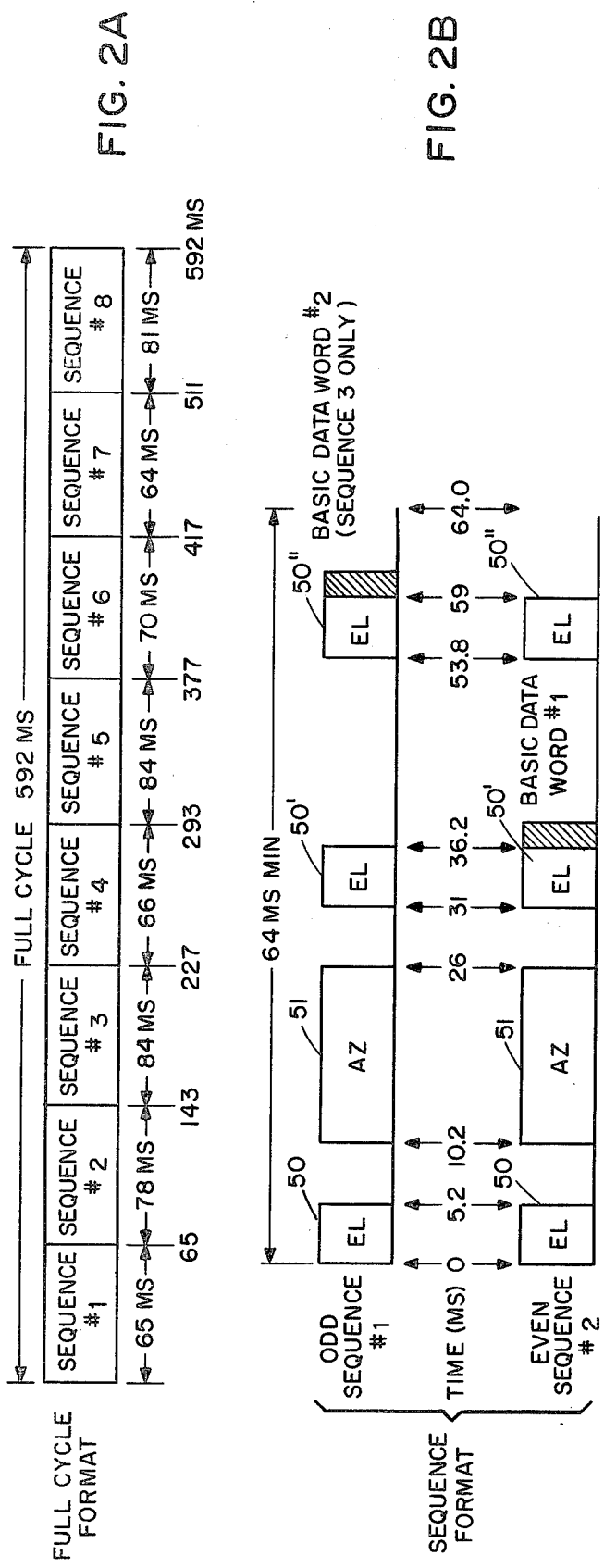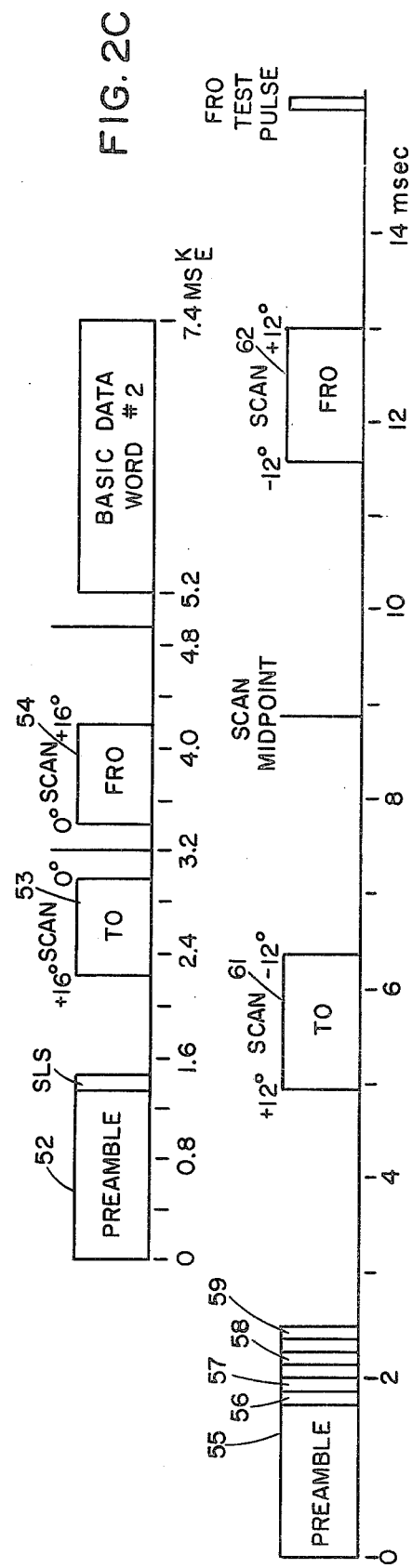

INTEGRATED ANTENNA APERTURE

The present invention relates to linear phased array antennas with particular regard to their application to microwave landing systems for aircraft.

There are currently under development several competitive microwave landing systems (MLS) intended to be used as the next generation of equipment to replace the currently widely deployed fixed beam instrument landing system (ILS). The goal of MLS is to provide a landing system of higher accuracy, higher reliability, higher traffic handling capacity and lower installation cost than is possible with ILS. One MLS which is highly favored as capable of attaining this goal is the time-referenced scanning beam system which has received substantial developmental support from the United States Federal Aviation Agency and which has been demonstrated highly successfully in its prototype stage. The present invention relates to the ground based apparatus of the MLS and the description to follow is largely confined to such apparatus.

The time-referenced scanning beam MLS as presently configured for smaller airports includes means for transmitting a signal identifying the facility at which the MLS is located; means for transmitting azimuth quidance signals within a sector of ±12 degrees from the center line of the runway in use; means for transmitting elevation guidance signals within the sector of from zero to 16 degrees in the vertical plane; means for transmitting azimuth sector guidance signals within the sectors +12 degrees to +40 degrees and −12 degrees to −40 degrees of the runway center line providing only "fly left" or "fly right" information and means for transmitting data signals for the purpose of synchronizing airborne receivers with the ground based apparatus and for the purpose of conveying such information as the location of the azimuth and elevation guidance antennas with respect to the touch-down point, runway conditions, etc.

For the identification signals in both elevation and azimuth, azimuth sector guidance signals, and data transmission in both elevation and azimuth it is desirable to transmit with broad coverage, enabling early acquisition and lock-on of signals by airborne receivers and preconditioning them for the receipt of guidance signals. Also, to prevent the acquisition of false signals in areas outside the coverage of elevation scan and outside the coverage of azimuth sector guidance and scan, side lobe suppression signals are transmitted with broad coverage. Such broad coverage is best obtained with a non-scanning broad beamwidth antenna. On the other hand, provision of elevation or azimuth guidance requires a scanning narrow beamwidth antenna. These differing requirements have heretofore been met by providing separate antennas for left sector guidance, right sector guidance, azimuth identification, side lobe suppression and data, and elevation identification, side lobe suppression and data, all of broad beamwidth non-scanning types and by providing separate antennas of the scanning narrow beamwidth type for transmitting azimuth and elevation proportional guidance signals. The scanning beam antennas may be of the linear phased array type as described in U.S. Pat. No. 3,999,182, to which reference will further be made hereinafter, or it may be of the beamport type, as described in U.S. Pat. No. 3,878,523.

The present invention is applicable to a microwave landing system utilizing linear or planar phased arrays for generation of the azimuth and elevation guidance beams. It affords the particular advantages of eliminating the need for providing separate broad beam antennas for transmitting facility identification, sector guidance flight information and side lobe suppression signals within the solid angle in front of the aperture, as well as the rf switching means associated with such antennas.

It is an object of the present invention to provide a microwave landing system of improved reliability and efficiency by utilizing the same antennas which generate narrow scanning beams for transmitting proportional guidance signals in azimuth and elevation to generate broad non-scanning beams for transmitting facility identification, sector guidance and flight information signals.

It is a further object of the invention to reduce the costs of manufacture and installation of a microwave landing system by eliminating separate antennas, and their housings and accessory parts, required for transmitting sector guidance, identification and other signals in broad, non-scanning beams.

Briefly, the invention applies to a microwave landing system in which a scanning beam for proportional guidance is transmitted by a phased array antenna. The scanning beam has narrow beamwidth and low side lobe levels to provide accurate proportional guidance signals. The beamwidth and sidelobe levels are established by the dimensions of the array and by taper of the amplitudes of currents feeding elements of the array, on the assumption that there is a constant phase difference between the element feed currents. Scanning motion is imparted to the narrow beam by varying as a linear function of time the phase of the feed currents of each of the elements of the array. The phases of the element currents are adjusted by electronically controlled individual phase shifters associated with each of the elements of the array. Antenna theory has shown that if the phase difference between the feed currents of adjacent elements is not constant the antenna pattern will be altered. In accordance with the invention, at the time signals are to be transmitted in a broad beamwidth pattern, each of the phase shifters of the array are adjusted to values conforming to a function hereinafter described which does not yield constant phase difference between feed currents of adjacent elements of the array. The phase shifts applied to the element feed currents at this time, hereinafter referred to as spoiling phases, have the effect of broadening the normally narrow beam antenna pattern of the phased array to provide coverage equal to that formerly provided by separate broad beamed antennas. At the time proportional guidance signals are to be transmitted on a narrow, scanning beam, the spoiling phases are removed from the phase shifters which are then adjusted to conform to the well known formula $\phi_n = (-2\pi n d)/(\lambda) \sin \alpha$. In this formula $\phi_n$ is the phase shift applied to the feed current at array element n, d is the distance of element n from the center of the array and $\alpha$ is the angle between the axis of the beam and the normal to the axis of the array. Scanning motion is imparted to the beam by causing $\alpha$ to vary with time. Thus by readjusting the phase shifters of the array to provide spoiling phases, during times when formerly the array antenna would have been idle and the transmitter would have been switched to broad beam antennas, the phased array antenna can perform the function of the broad beam antennas formerly required and the broad beam antennas, transmission lines connected thereto and the rf switch can be eliminated.

In the drawings:

FIGS. 2A-2D are diagrams illustrating the time sequence multiplex signal format currently approved as standard for the scanning beam Microwave Landing System.

Figure 1:
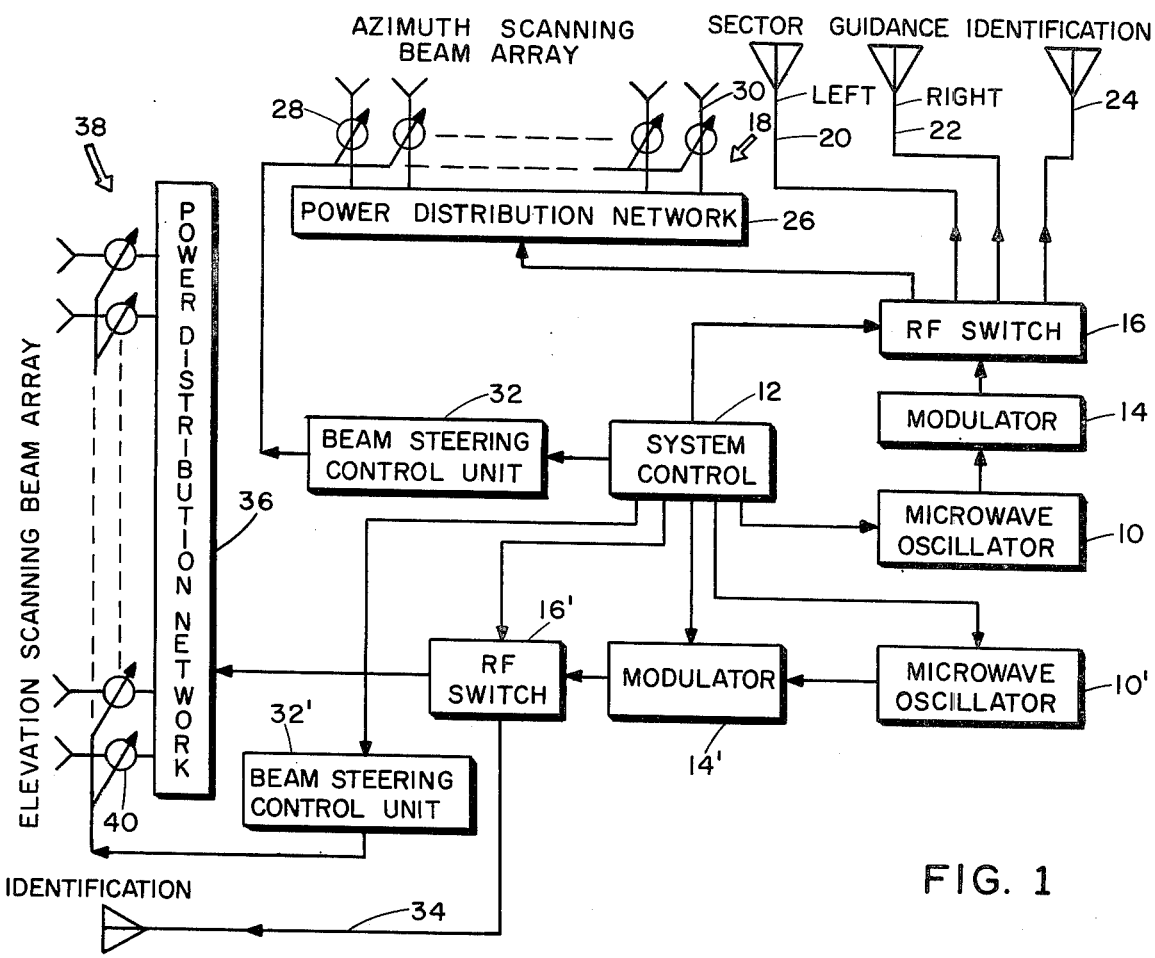
FIG. 1 is a functional block diagram of a ground-based Microwave Landing System transmitter of the prior art.

FIG. 1 illustrates a microwave landing system of the prior art. For azimuth guidance, a microwave oscillator 10 generates continuous wave energy when actuated by a system control unit 12. Energy from oscillator 10 passes through a modulator 14 where during certain signal sequences data is impressed thereon. In other signal sequences energy passes through modulator 14 without modulation. From modulator 14 energy is supplied to an rf switch 16 which, at the command of the system control unit 12, depending on the signal sequence involved, feeds the energy to a scanning narrow beam phased array antenna 18 or to any one of three broad beam antennas 20, 22 or 24. Antennas 20-24 transmit, respectively, left sector guidance, right sector guidance and identification signals. During the azimuth scanning beam signal sequence, switch 16 supplies energy to the power distribution network 26 of the phased array antenna 18. At this time the beam from antenna 18 is caused to scan back and forth or "to" and "fro" about the centerline of the airport runway. Scanning motion of the beam of antenna 18 is generated by applying progressive phase increments through digitally controlled phase shifters 28 to each of the radiating elements 30 of the array. The phase shifters 28 operate under the command of a beam steering control unit 32 which determines the amount of phase shift required by each element and the order and rate at which the phase shifters are incremented to provide smooth scanning motion of the beam. A linear phased array antenna and beam steering control unit suitable for use with the present invention are described in greater detail in U.S. Pat. No. 3,999,182, issued Dec. 21, 1976 to A. W. Moeller et al.

The elevation guidance and identification signals occupy time slots interspersed with those of the azimuth guidance and identification signals. At the appropriate time in the signal sequence, the system control 12 turns off oscillator 10 and energizes microwave oscillator 10'. Power from oscillator 10' flows through modulator 14', where it is either modulated or not modulated according to the signal sequence involved, to an rf switch 16'. At the time slots designated for transmission of the elevation identification and data signals the system control 12 operates switch 16' to furnish power to a broad beam identification antenna 34 and supplies data to modulator 14' for modulating the carrier from oscillator 10' with information pertaining to the station identification and other particulars such as antenna location and height. At the time slots designated for the transmission of elevation guidance signals the system control 12 operates switch 16' to furnish unmodulated power to the power distribution network 36 of the elevation scanning beam phased array antenna 38. Simultaneously the system control 12 actuates the beam steering control unit 32' which controls the digital phase shifters 40 of the elevation array 38 to produce a smooth up and down scanning motion of narrow elevation beam. Beam steering control unit 32' operates in the same manner as beam steering control unit 32 in computing the phase increments and their order of application for the phase shifters 40 of array 38.

The signal format adopted as standard for time reference scanning beam MLS is shown in simplified form in FIGS. 2A through 2D. All signals are transmitted on the same frequency utilizing time division multiplexing to separate the signal functions. As seen in FIG. 2A the complete format cycle comprises eight sequences each of which begins and ends at a precisely synchronized time but each of which differs slightly in duration to prevent accidental synchronization with interfering sources. Referring to FIG. 2B, each of the sequences comprises an elevation function 50, an azimuth function 51, followed by two elevation functions 50' and 50". A basic data word no. 1 is appended to elevation function 50' during the even numbered sequences of FIG. 2A. A basic data word no. 2 is appended to elevation function 50" only during sequence 3 of FIG. 2A.

Referring to FIG. 2C each of the elevation functions 50, 50' and 50" begins with a preamble 52, which according to the prior art system of FIG. 1, is transmitted by broad beamed antenna 34. The preamble conveys digital data, by means of differential phase shift keying in modulator 14' of the carrier from oscillator 10' (FIG. 1), which includes a code enabling airborne receivers to synchronize with the ground system, the identification of the facility, and the minimum selectable glideslope. Following the preamble, switch 16' (FIG. 1) energizes the elevation phased array antenna 38 and the narrow elevation beam commences scan, under the command of steering control unit 32, from the highest elevation angle (16 degrees in one embodiment) towards 0 degrees elevation. This period of scan is shown in segment 53. After reaching 0 degree elevation, oscillator 10' is switched off by system control 12 for 400 us. Then the oscillator is reactivated and scan is conducted from 0 degrees elevation to 16 degrees elevation during the period which appears as segment 54. Basic data word no. 2, appended to elevation function 50' in sequence 3, contains information on the location of antenna 38 relative to the airport runway. Basic data word no. 1 is appended to elevation function 50' during even numbered sequences. Data word no. 1 is transmitted by broad beamed antenna 24 (FIG. 1) and may contain information such as surface winds, runway conditions and the like.

Referring to FIG. 2D, azimuth function 51 commences with a preamble, the initial portion 55 of which is transmitted by broad beamed antenna 24 and contains a synchronization code, facility identification and other information. The concluding portions 56-59 transmitted sequentially by antennas 20 and 22 (FIG. 1) contain sector guidance and sidelobe suppression signals. Antennas 20 and 22 are both broad beamed and in one embodiment antenna 20 has coverage extending from about +10 degrees to about +40 degrees from the runway centerline and antenna 22 provides coverage from about −10 degrees to −40 degrees. The proportional guidance beam transmitted by phased array antenna 18 (FIG. 1) in this embodiment is 3 degrees wide and scans between +12 degrees and −12 degrees of the runway centerline. Thus an aircraft approaching the runway at an azimuth angle of greater than about +10 degrees but less than +40 degrees would receive a strong signal from antenna 20 which would be presented to the pilot as an instruction to fly left.

Following transmission of the preamble and sector guidance signals, switch 16 (FIG. 1) energizes the azimuth phased array antenna 18 and under command of beam steering control unit 32, during segment 61, the narrow azimuth guidance beam scans from an azimuth of +12 degrees to −12 degrees. When the scan reaches −12 degrees oscillator 10 is switched off for a period of 2600 us. then turned on again as scan is conducted from −12 degrees to +12 degrees during segment 62.

Figure 3:
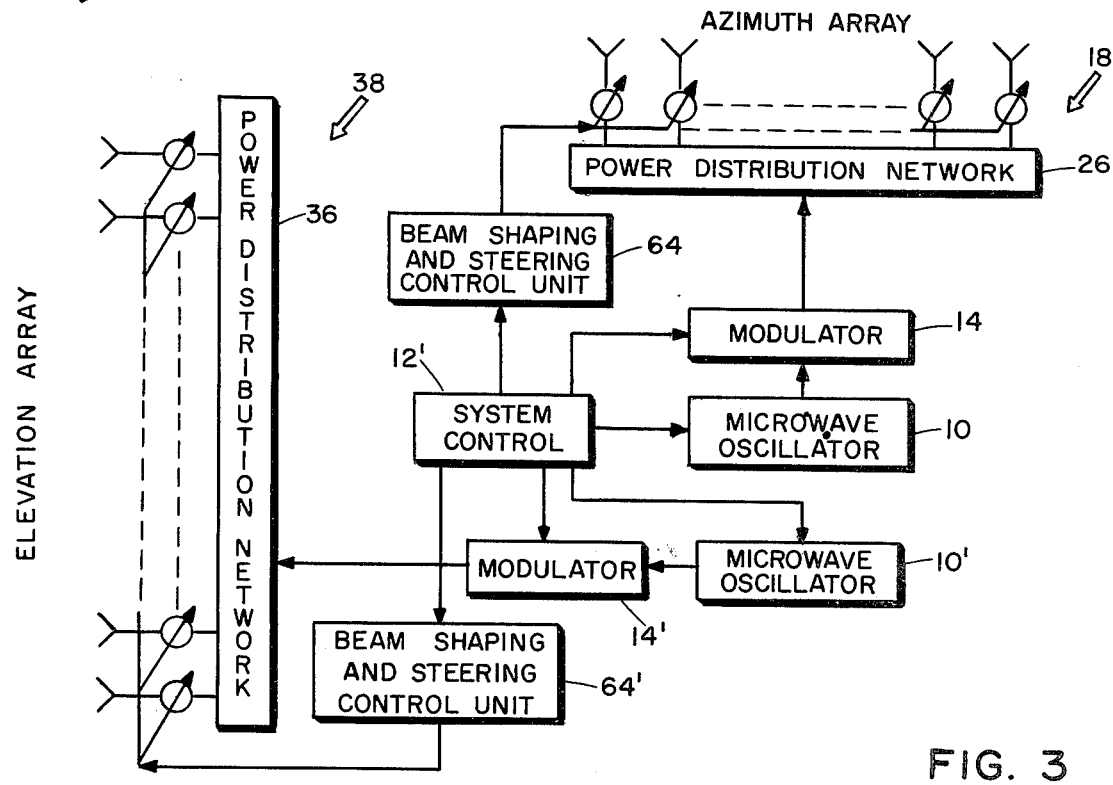
FIG. 3 is a functional block diagram of the Microwave Landing System as improved by the present invention.

The signal format of FIGS. 2A-2D described with reference to the prior art system of FIG. 1 is likewise applicable to the system of the invention shown in FIG. 3. FIG. 3 differs from FIG. 1 in that the broad beam antennas 20, 22, 24 and 34 and the rf switches 16 and 16′ of FIG. 1 have been eliminated. In FIG. 3 the output of modulator 14 is connected directly to the power distribution network 26 of the azimuth phased array antenna 18. The output of modulator 14′ is connected directly to the power distribution network 36 of the elevation phased array antenna 38. The beam steering control units 32 and 32′ of FIG. 1 are replaced by beam shaping and steering control units 64 and 64′.

Control units 64 and 64′ differ from control units 32 and 32′ in that each of units 64 and 64′ includes a memory section wherein are stored fixed values of "spoiling phases" for each of the variable phase shifters 28 and 40 of the respective arrays. At the time of transmission of basic data words nos. 1 and 2, the preambles 52 and 55 and sector guidance signals 56-59, as seen in FIGS. 2C and 2D, system control 12′ commands control units 64 or 64′, whichever is appropriate, to apply the spoiling phases stored therein to the phase shifters of their respective arrays. The array beam patterns are thereby broadened to provide coverage corresponding to that formerly provided by antennas 20, 22, 24 and 34. At the times in the signal sequence prescribed for transmission of narrow scanning beams, system control 12′ commands control units 64 or 64′, whichever is appropriate, to remove the spoiling phases from the phase shifters of the respective arrays and to apply phase increments thereto providing uniform phase across the aperature of the arrays. Obviously switches 16 and 16′ may be dispensed with since phased array antennas 18 and 38 are the only radiators required.

The spoiling phases are computed from formulas derived from the application of the principle of stationary phase to the general formula for computing the antenna pattern of a continuous linear array. The principle of stationary phase states that any given angle off boresight of the array the field intensity will be due only to the contributions of a limited number of elements adjacent to some point on the array since the contributions from elements outside the limits differ greatly in phase and the resultant thereof tends towards zero. It is assumed therefore that the phase distribution of the elements, for each angle off boresight of the array, is some function which possesses a minimum value at some point on the array. The antenna pattern can be computed by integrating the contributions of elements within a limited distance along the array from the element possessing minimum phase.

The integral representation is, strictly speaking, for a continuous aperture, e.g., a horn or parabola. For arrays of many elements, the difference between the summation $$F(\theta) = \sum_{i=1}^{N} F_i e^{-j\frac{2\pi}{\lambda} g_i}$$

and the integral is negligible. By using the continuous aperture (integral) representation, the mathematics is simplified. Sampling theorem can then be used to apply the results to an array of a finite number of elements.

The array pattern is given by $$F(\theta) = \int_{-\frac{D}{2}}^{\frac{D}{2}} f(x) e^{j\frac{2\pi}{\lambda} g(x,\theta)} dx \quad (1)$$

where
 $F(\theta)$ is the array factor
 $\theta$ is the angle off boresight
 D is the length of the array
 x is the distance along the array
 f(x) is the amplitude of excitation along the array
 $\lambda$ is the wavelength
 $g(x,\theta)$ is the phase distribution along the array.

Since it is assumed that the pattern results from the contribution of elements within a limited distance of $\pm \epsilon$ about the point $x_o$ of the array at which $g(x,\theta)$ is at a minimum, the pattern is given approximately by $$F(\theta) \approx \int_{x_o - \epsilon}^{x_o + \epsilon} f(x) e^{j\frac{2\pi}{\lambda} g(x,\theta)} dx. \quad (2)$$

Expanding $g(x,\theta)$ as a power series and discarding higher order terms $$g(x, \theta) = g(x_o, \theta) + g'(x_o, \theta)[x - x_o] + g''\frac{(x_o, \theta)[x - x_o]^2}{2}. \quad (3)$$

Now $g(x,\theta)$ is at a minimum at $x_o$, hence the first derivative $g'(x_o,\theta)=0$ and equation (3) becomes $$g(x,\theta)=g(x_o, \theta)+g''(x_o, \theta)[x-x_o]^2/2. \quad (4)$$

Substituting equation (4) in equation (3)

$$F(\theta) \approx \int_{x_o - \epsilon}^{x_o + \epsilon} f(x) e^{j\frac{2\pi}{\lambda} \left[ g(x, \theta) + g''(x_o, \theta) \frac{[x - x_o]^2}{2} \right]} dx. \quad (5)$$

Since $f(x)$ and $g(x_o,\theta)$ are substantially constant through the interval of integration equation (5) can be simplified to $$F(\theta) \approx f(x) e^{j\frac{2\pi}{\lambda} g(x_o, \theta)} \int_{x_o - \epsilon}^{x_o + \epsilon} e^{\frac{j\pi g''(x_o, \theta)[x - x_o]^2}{\lambda}} dx. \quad (6)$$

The integral evaluated over the interval $x_o \pm \epsilon$ is substantially equal to the integral evaluated from $\pm \infty$ and since $$\int_{-\infty}^{+\infty} e^{-\alpha x^2} dx = \int_{-\infty}^{\infty} e^{-\alpha[x - x_o]^2} dx = \sqrt{\frac{\pi}{\alpha}}$$

equation (6) can be evaluated by letting $$\alpha = -j\pi g''(x,\theta)/\lambda$$

and by replacing the limits of integration with $\pm \infty$, then $$F(\theta) \approx f(x) e^{j\frac{2\pi}{\lambda} g(x,\theta)} \cdot \sqrt{\frac{\pi}{\alpha}} = $$

$$F(\theta) \approx f(x) e^{j\frac{2\pi}{\lambda} g(x,\theta)} \left\{ -\frac{\lambda}{j g''(x,\theta)} \right\}^{\frac{1}{2}} \quad (7)$$

$g(x,\theta)$ may be expressed as $$g(x,\theta) = \phi(x) + x \sin \theta \quad (8)$$

and $$(d/dx)g(x,\theta) = \phi'(x) + \sin \theta \quad (9)$$

and $$(d^2/dx^2)g(x,\theta) = \phi''(x). \quad (10)$$

The power pattern, $P(\theta)$, of the antenna is obtained by squaring equation (7)

$$P(\theta) = F(\theta)^2 \approx f^2(x) K / g''(x, \theta). \quad (11)$$

Substituting equation (10) in equation (11)

$$P(\theta) \approx f^2(x) K / \theta''(x) \quad (12)$$

where $K$ = constant.

The spoiling phases $\phi(x_o)$ are obtained by rearranging and integrating equation 12, thus $$\phi(x) = K \int \int f^2(x)/P(\theta) dx\, dx. \quad (13)$$

A frequently employed excitation function, $f(x)$, for a phased array antenna is the Taylor function developed in an article by T. T. Taylor published in "Transactions IRE, Vol. AP-3, No. 1, January 1955, pp. 16 ff." The Taylor function is defined by $$f(x) = \frac{1}{2\pi} \left\{ F_o + 2 \sum_{i=1}^{\bar{n}-1} F_i \cos \frac{\pi i x}{L} \right\}, \quad -L \leq x \leq L \quad (14)$$

wherein
$L$ is one-half the array length, in wavelengths $$F_i = \frac{[(\bar{n} - 1)!]^2}{(\bar{n} - 1 + i)!(\bar{n} - 1 - i)!} \quad (15)$$

$$\prod_{n=1}^{\bar{n}-1} \left( 1 - \frac{i^2}{\sigma^2[A^2 + (n - \frac{1}{2})^2]} \right)$$

$$\sigma = \frac{\bar{n}}{\sqrt{A^2 + (\bar{n} - \frac{1}{2})^2}} \quad (16)$$

$$A = \frac{1}{\pi} \text{arc cosh } \eta \quad (17)$$

$$\eta = \frac{\text{peak main beam voltage}}{\text{peak first sidelobe voltage}}$$

$\eta$ is selected to set the sidelobe level and
$\bar{n}$ is selected to set the approximate number of equal sidelobes.

An adequate approximation of the value of the spoiling phases may be obtained utilizing only the first two terms of equation 14 in the computation. Also the $1/2\Pi$ factor therein may be dropped, then $$f(x) \approx F_o + 2F_1 \cos \pi x/L \quad (18)$$

$$f^2(x) \approx (F_o^2 + 2F_1^2) + 4F_oF_1 \cos (\Pi x/L) + 2F_1^2 \cos (2\Pi x/L) \quad (19)$$

Assuming the beam to be formed by the spoiling phases is rectangular, then $P(\theta)$ of equation 13 is $$P(\theta) = \begin{cases} 1 & \theta_1 \leq \theta \leq \theta_2 \\ 0 & \text{elsewhere} \end{cases} \quad (20)$$

From equations 12, 19 and 20.

$$\phi''(x) = K \left[ (F_o^2 + 2F_1^2) + 4F_oF_1 \cos \frac{\pi x}{L} + 2F_1^2 \cos \frac{2\pi x}{L} \right] \quad (21)$$

Integrating $$\phi'(x) = K \left[ (F_o^2 + 2F_1^2) x + \frac{4L}{\pi} F_oF_1 \sin \frac{\pi x}{L} + \frac{L}{\pi} F_1^2 \sin \frac{2\pi x}{L} \right] + b \quad (22)$$

Integrating again $$\phi(x) = K \left[ (F_o^2 + 2F_1^2) \frac{x^2}{2} - \frac{4L^2}{\pi^2} F_oF_1 \cos \frac{\pi x}{L} - \frac{L^2}{2\pi^2} F_1^2 \cos \frac{2\pi x}{L} \right] + bx + d \quad (23)$$

The constants b and K are found from the limiting values $\theta_1$, $\theta_2$, L, $-L$ and equations 9 and 21 as $\phi'(x) + \sin\theta = 0$ $\phi'(-L) = -\sin\theta_1$ $\phi'(L) = -\sin\theta_2$ $K = (\sin\theta_2 - \sin\theta_1)/-2L(F_o^2 + 2F_1^2)$ (24)

$b = (-\sin\theta_1 - \sin\theta_2)/2.$ (25)

The final constant of integration, d, equation 23, is set to zero.

From equations 1, 8 and 23 the spoiling phase $\phi(n)$ required for each phase shifter of the array is $\phi(n) = (2\pi/\lambda)\phi(x) \text{RADIANS}, x = nd$ (26)

where n is the element number of the array and d is the interelement spacing, in wavelengths.

Applying the foregoing to a specific example of an azimuth phased array having the characteristics
$L = 10.15\ \lambda$, 35 elements spaced $0.58\lambda$
$\bar{n} = 8$
$\eta = -27$ db
From equation 17, $A = 1.209$
From equation 16, $\sigma = 1.053$
From equation 15, $F_1 = 0.235$, $i = 1$, $F_o = 1$
$\theta_1 = 9$ degrees, $\theta_2 = 41$ degrees
From equation 24, $K = -0.0221/\lambda$
From equation 25, $b = -0.406$.

Figure 4:
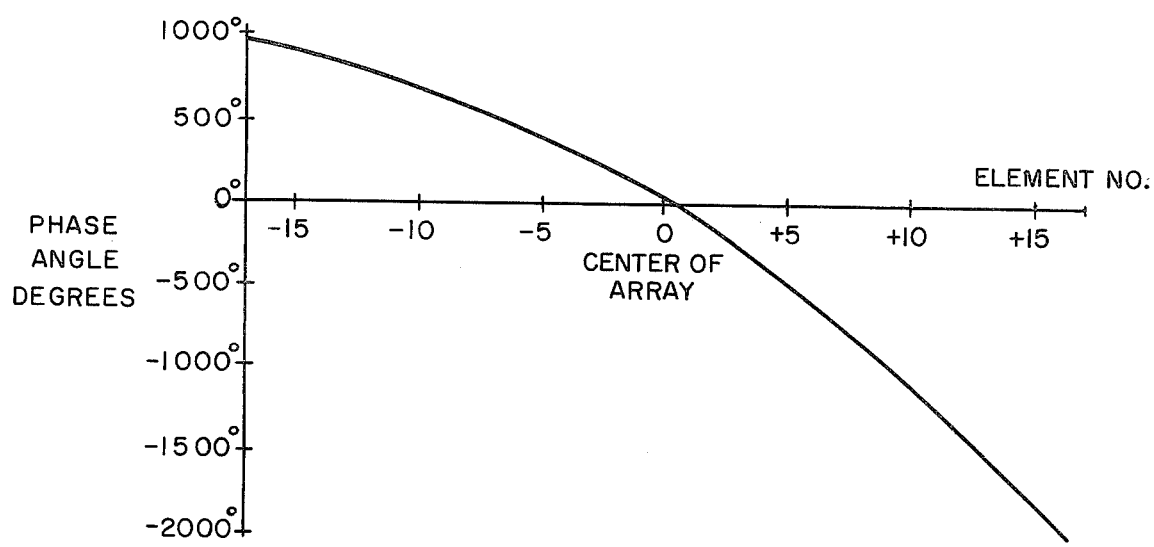
FIG. 4 is a chart showing the spoiling phase v. antenna element to be applied to a particular linear phased array antenna for broadening the pattern during transmission of azimuth sector guidance signals.
Figure 5:
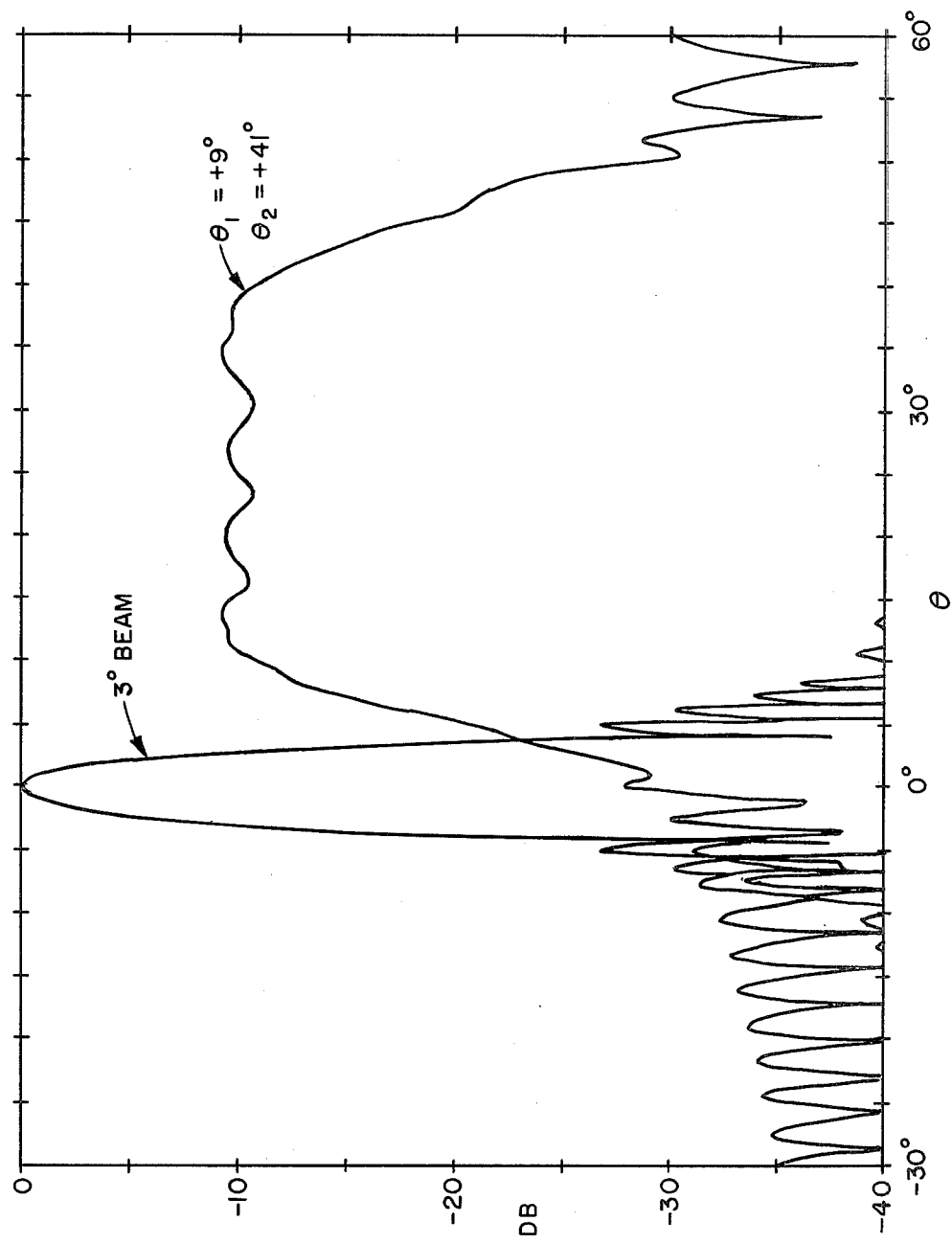
FIG. 5 illustrates the antenna pattern obtained with and without the spoiling phases of FIG. 4.

The computed spoiling phases for such an array are shown in FIG. 4 and the resulting beam pattern appears in FIG. 5. The pattern of FIG. 5 is suitable for transmitting sector guidance signals, portions 59 of FIG. 2D.

Figure 6:
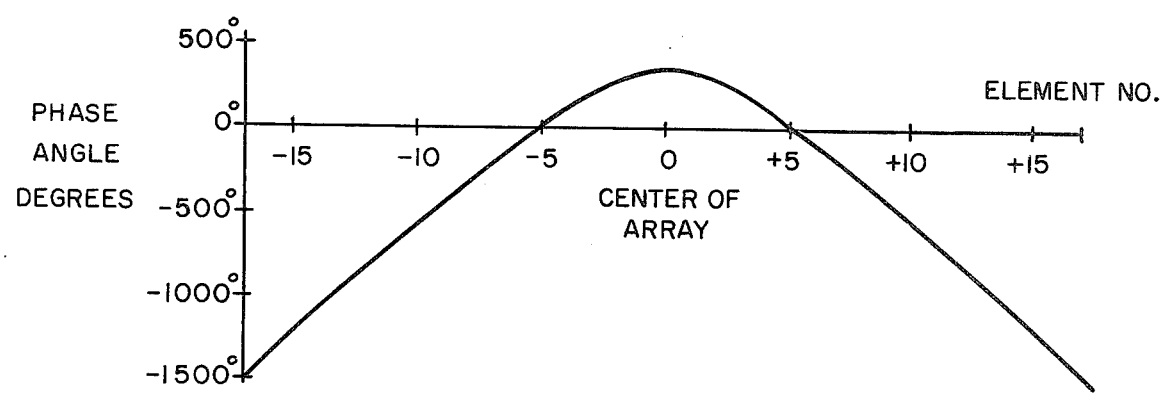
FIG. 6 is a plot of the spoiling phase v. antenna element for the particular antenna of FIG. 4 for broadening the broadening pattern for transmitting azimuth identification signals.
Figure 7:
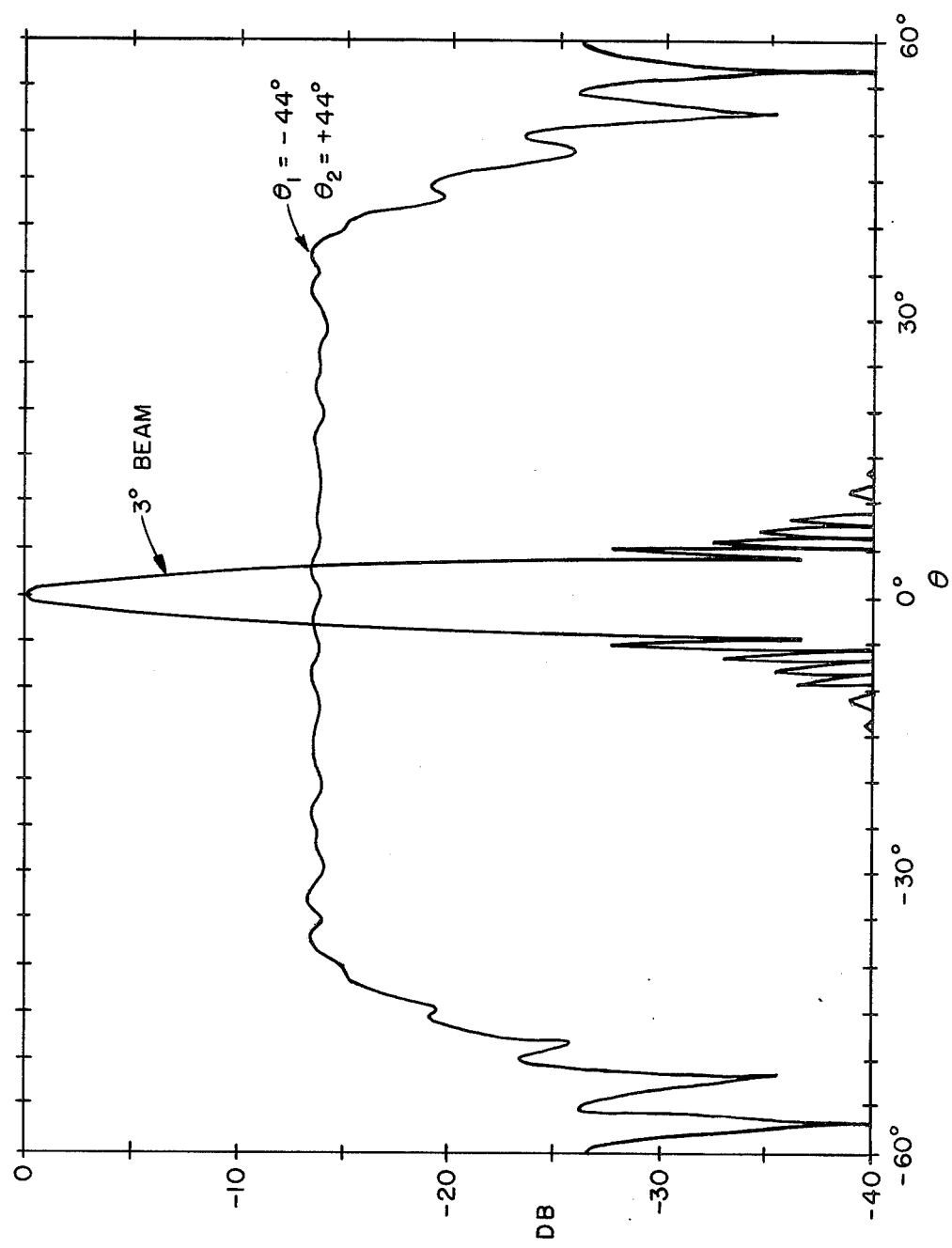
FIG. 7 illustrates the antenna pattern obtained with and without the spoiling phases of FIG. 6.

By changing the values of $\theta_1$ and $\theta_2$ to $+40$ degrees and $-40$ degrees, respectively, spoiling phases for an antenna of the above characteristics are computed as shown in FIG. 6 and the resultant pattern appears in FIG. 7. The pattern of FIG. 7 is suitable for transmitting basic data word no. 1, FIG. 2B, and the preamble, portion 55, FIG. 2D.

The function of elevation identification antenna 34 (FIG. 1) is provided by applying spoiling phases to the phase shifters of the elevation phased array antenna 38.

One embodiment of an elevation phased array antenna has the following characteristics:
$L = 30.46\ \lambda$, 41 elements spaced $0.743\lambda$
$\bar{n} = 8$
$\eta = -27$ db
$\theta_1 = -0.5$ degrees, $\theta_2 = 16.5$ degrees.

Figure 8:
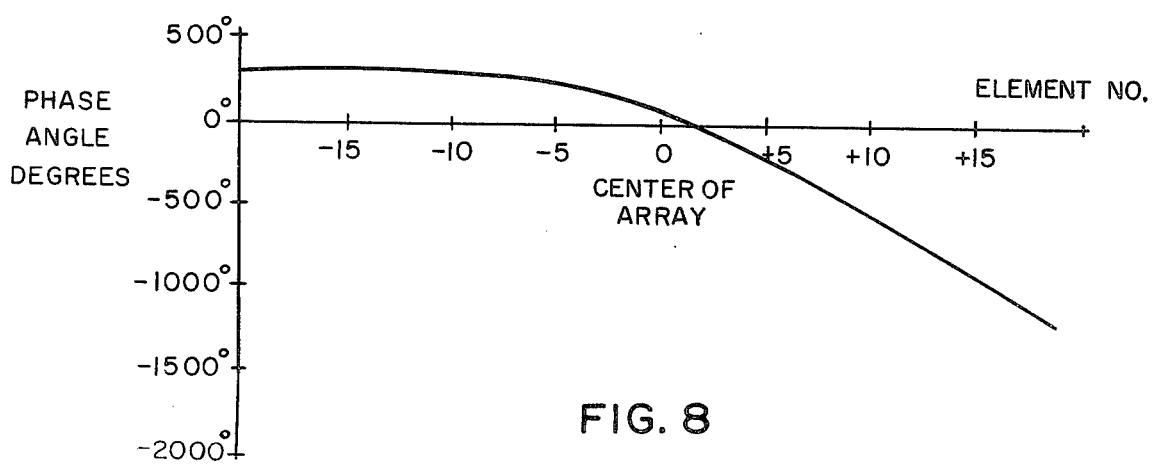
FIG. 8 is a plot of the spoiling phase v. antenna element to be applied to a particular linear phased array antenna for broadening the pattern during transmission of elevation identification signals.
Figure 9:
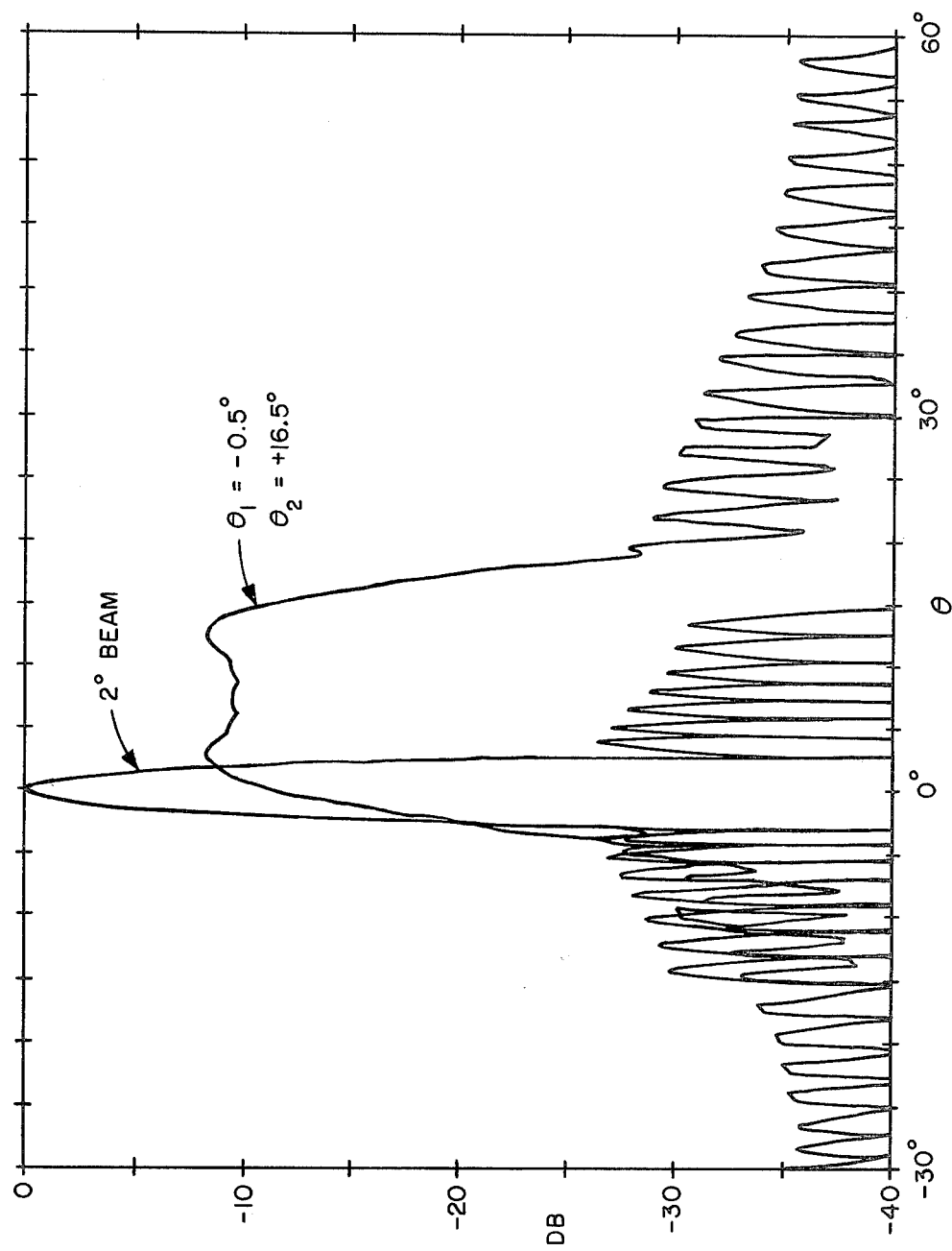
FIG. 9 illustrates the antenna pattern obtained with and without the spoiling phases of FIG. 8.

The spoiling phases, computed in the same manner as the preceding example are plotted in FIG. 8 and the resulting pattern appears in FIG. 9.

Although the invention has been disclosed as specifically embodied in linear phased array antennas, the principles of the invention are likewise applicable to planar phased array antennas where individual phase control of each row or column of the array is available. By controlling the phases of each row of elements beam shaping in the elevation plane can be achieved, while shaping in the horizontal plane is accomplished by controlling the column phases. Also, the invention can be used for generating shaped beams other than the rectangular beam described by equation (20). For example, the beam shape may be described by a composite of two functions each of which is applicable to a segment of space angle. The spoiling phases are computed for a segment of aperture, utilizing the appropriate function in place of equation (20) and the final constant of integration, d, of equation (23) is calculated to make the spoiling phase function continuous at the junction of the aperture segments.

The invention claimed is:

1. In a microwave landing system providing narrow scanning beam of microwave energy for guiding an aircraft during approach and landing and providing data signals transmitted in a broad pattern so as to be receivable in a greater area than the area covered by said narrow scanning beam, said system including a phased array antenna having a plurality of radiating elements with adjustable phase shifter means for adjusting the relative phases of currents radiated by said elements and signal sequence control means for controlling the sequence of transmission of said narrow beam signals and said broad beam signals, the improvement comprising means for applying non-uniform values of phase shift to said phase shifters of said array to broaden the antenna pattern of said array, said non-uniform values of phase satisfying the relationship $d^2\phi(x)/dx^2 = c f^2(x)/P(\theta)$ wherein
c is a constant;
f(x) is the aperture illumination function;
$\theta$ is the space angle;
x is the distance along the array; and
$\phi(x)$ is the non-uniform phase function; and
means applying uniform values of phase shift to said phase shifters of said array to cause said array to transmit with a narrow pattern in a direction determined by the value of said uniform phase shifts;
said sequencer selecting said means for applying non-uniform values of phase shift or said means for applying uniform values of phase shift according to whether or not transmission in a broad beam antenna pattern is desired.

2. The improvement as claimed in claim 1 wherein said means for applying non-uniform values of phase shift includes a plurality of sets of said non-uniform values, each of said sets broadening said array antenna pattern to a different extent, said sequencing means selecting a particular one of said sets when applying said non-uniform values to said phase shifters according to the function of the signal being transmitted in a broad beam antenna pattern.

3. The method of operating a phased array antenna to provide transmission of signals with broad beam coverage and transmission of signals with narrow beam coverage in ordered sequence, said antenna having a plurality of radiating elements and adjustable phase shifters for controlling the relative phases of currents in said elements, comprising adjusting said phase shifters each to a value of phase shift specified by a set of non-uniform values of phase shift derived from a relationship between the phase shift $\phi(x)$ at an element of said array located a distance x along said array is such that the second derivative with respect to x of said relationship, $d^2\phi(x)/d_x^2$, is proportional to the ratio of the square of the amplitude of excitation, $f^2(x)$, of said element to the desired broad beam pattern, $P(\theta)$;

exciting the elements of said array with radio frequency energy to transmit signals with broad beam coverage defined by said broad beam pattern, $P(\theta)$;

removing said non-uniform values of phase shift from said phase shifters;

readjusting said phase shifters to uniform values of phase shift such that the difference between values of phase shift for adjacent elements of said array is constant; and exciting the elements of said array with radio frequency energy to transmit signals with narrow beam coverage.

4. The method of claim 3 wherein said step of readjusting said phase shifters includes varying said uniform values of phase shift as a function of time while still maintaining constant the difference between values of phase shift for adjacent elements of said array thereby imparting a scanning motion to said narrow beam.

* * * * *